(12) United States Patent
Mccordic et al.

(10) Patent No.: US 12,496,648 B2
(45) Date of Patent: Dec. 16, 2025

(54) FURNACE BRAZE CYCLE ENHANCEMENT

(71) Applicants: Raytheon Company, Waltham, MA (US); Brazonics, Inc., Hampton, NH (US)

(72) Inventors: Craig H. Mccordic, Medfield, MA (US); Mary K. Herndon, Littleton, MA (US); Ralph P. Mason, Chelmsford, MA (US); Edward I. Holmes, Acton, MA (US); Lee P. Barber, Hudson, MA (US); Jordan Joel Castillo, Salem, MA (US); Scott J. Champagne, Manchester, NH (US); Brian K. Bacon, Epping, NH (US)

(73) Assignees: RAYTHEON COMPANY, Waltham, MA (US); BRAZONICS, INC., Hampton, NH (US)

( * ) Notice: Subject to any disclaimer, the term of this patent is extended or adjusted under 35 U.S.C. 154(b) by 530 days.

(21) Appl. No.: 17/992,322

(22) Filed: Nov. 22, 2022

(65) Prior Publication Data
US 2024/0165725 A1    May 23, 2024

(51) Int. Cl.
*B23K 1/19* (2006.01)
*B23K 3/08* (2006.01)

(52) U.S. Cl.
CPC . *B23K 1/19* (2013.01); *B23K 3/08* (2013.01)

(58) Field of Classification Search
CPC .... B23K 1/0006; B23K 1/0008; B23K 1/001; B23K 1/0012; B23K 1/0014; B23K 1/0018
See application file for complete search history.

(56) References Cited

U.S. PATENT DOCUMENTS

| | | |
|---|---|---|
| 8,059,408 B2 | 11/2011 | Lemak et al. |
| 10,347,559 B2 | 7/2019 | Fan et al. |
| 10,785,863 B2 | 9/2020 | Trulli et al. |

(Continued)

FOREIGN PATENT DOCUMENTS

| | | | |
|---|---|---|---|
| JP | 5612471 B2 | | 10/2014 |
| JP | 2016132113 A | * | 7/2016 |
| WO | 2022223147 A1 | | 10/2022 |

OTHER PUBLICATIONS

International Search Report with Written Opinion issued in International Application No. PCT/US2023/036658; International Filing Date Nov. 2, 2023; Date of Mailing Jun. 12, 2024 (8 pages).

(Continued)

*Primary Examiner* — Ricardo D Morales
(74) *Attorney, Agent, or Firm* — CANTOR COLBURN LLP

(57) ABSTRACT

A method of decreasing a cycle time of a brazing process is provided. The method includes arranging each of first and second pairs of braze parts together, each of the first and second pairs of the braze parts having braze material interposed between the braze parts, stacking the first and second pairs of the braze parts to form a stack, interposing pyrolytic graphite (PG) between the first pair of the braze parts and the second pair of the braze parts in the stack and heating the first and second pairs of the braze parts to a brazing temperature to braze the braze parts of each of the first and second pairs of the braze parts together.

20 Claims, 5 Drawing Sheets

(56) References Cited

U.S. PATENT DOCUMENTS

2007/0053168 A1    3/2007  Sayir et al.
2012/0261104 A1*  10/2012  Kelly .................... B23K 20/02
                                                            165/177

OTHER PUBLICATIONS

McKinley et al. "Pyrolytic graphite film thermal straps: Characterization testing" Cryogenics 80 (Dec. 2016) Abstract Only.

* cited by examiner

FURNACE BRAZE CYCLE ENHANCEMENT

BACKGROUND

Exemplary embodiments of the present disclosure relate generally to vacuum brazing and, in one embodiment, vacuum braze cycle enhancement using pyrolytic graphite (PG).

PG is the generic term that includes thermal pyrolytic graphite (TPG), anneled pyrolytic graphite (APG), and highly oriented pyrolytic graphite (HOPG). There are other materials with high thermal diffusivities above about 500 mm2/s or more as well. These include, but are not limited to, materials incorporating carbon such as carbon fiber, pyrolytic carbon, diamond and also nitrides and carbides.

Brazing is a metal-joining process in which two or more metal items are joined together by melting and flowing a filler metal into the joint, with the filler metal having a lower melting point than the adjoining metal. Brazing differs from welding in that it does not involve melting the work pieces. Brazing differs from soldering through the use of a higher temperature (liquidus temperature above 450° C. or 840° F.). During brazing processes, the filler metal flows into the gap between close-fitting parts by capillary action. The filler metal is brought slightly above its melting (liquidus) temperature while protected by a suitable atmosphere, usually a vacuum. It then wets and reacts with the base metal and is cooled to join the work pieces together.

Many technologies make use of significant numbers of braze parts. For example, a certain technology may involve hundreds of chassis, with each chassis having multiple individual brazements. Coldplate technologies, in particular, often have multiple parts that are brazed together to form a coldplate.

SUMMARY

According to an aspect of the disclosure, a method of decreasing a cycle time of a brazing process is provided. The method includes arranging each of first and second pairs of braze parts together, each of the first and second pairs of the braze parts having braze material interposed between the braze parts, stacking the first and second pairs of the braze parts to form a stack, interposing pyrolytic graphite (PG) between the first pair of the braze parts and the second pair of the braze parts in the stack and heating the first and second pairs of the braze parts to a brazing temperature to braze the braze parts of each of the first and second pairs of the braze parts together.

In accordance with additional or alternative embodiments, the PG increases an effective thermal diffusivity of the stack and correspondingly reduces a cycle time required to braze the braze parts of each of the first and second pairs of the braze parts together.

In accordance with additional or alternative embodiments, the PG increases the effective thermal diffusivity of the stack by about 3.0 times or more.

In accordance with additional or alternative embodiments, the PG has a thermal diffusivity of about 500 mm2/s or more.

In accordance with additional or alternative embodiments, the brazing temperature is between about 1050-1200° F.

In accordance with additional or alternative embodiments, the method further includes interposing first and second stop-off layers between the PG and each of the first and second pairs of the braze parts, respectively.

In accordance with additional or alternative embodiments, the method further includes encasing the PG in a metallic encasement.

In accordance with additional or alternative embodiments, the method further includes layering PG on at least one of a top and a bottom of the stack.

In accordance with additional or alternative embodiments, the method further includes at least one or more of bending the PG around exterior edges of at least one of the first and second pairs of the braze parts and attaching an additional PG piece to the PG to abut with the exterior edges of the at least one of the first and second pairs of the braze parts.

According to an aspect of the disclosure, a method of decreasing a cycle time of a brazing process is provided. The method includes arranging multiple pairs of braze parts together, each of the multiple pairs of the braze parts having braze material interposed between the braze parts, stacking the multiple pairs of the braze parts to form a stack, interposing pyrolytic graphite (PG) between adjoining ones of the multiple pairs of the braze parts and heating the multiple pairs of the braze parts to a brazing temperature to braze the braze parts of each of the multiple pairs of the braze parts together.

In accordance with additional or alternative embodiments, the PG increases an effective thermal diffusivity of the stack and correspondingly reduces a cycle time required to braze the braze parts of each of the multiple pairs of the braze parts together.

In accordance with additional or alternative embodiments, the PG increases the effective thermal diffusivity of the stack by about 3.0 times or more.

In accordance with additional or alternative embodiments, the PG has a thermal diffusivity of about 500 mm2/s or more.

In accordance with additional or alternative embodiments, the brazing temperature is between about 1050-1200° F.

In accordance with additional or alternative embodiments, the method further includes interposing stop-off layers between the PG and each of the corresponding ones of the multiple pairs of the braze parts, respectively.

In accordance with additional or alternative embodiments, the method further includes encasing the PG in a metallic encasement.

In accordance with additional or alternative embodiments, the method further includes layering PG on at least one of a top and a bottom of the stack.

In accordance with additional or alternative embodiments, the method further includes at least one or more of bending the PG around exterior edges of at least one of the multiple pairs of the braze parts and attaching an additional PG piece to the PG to abut with the exterior edges of the at least one of the first and second pairs of the braze parts.

According to an aspect of the disclosure, a method of decreasing a cycle time of a brazing process. The method includes forming first and second stacks, each comprising multiple pairs of braze parts, arranging the first and second stacks adjacent to one another, interposing pyrolytic graphite (PG) between at least one adjoining pair of the multiple pairs of the braze parts in the first stack, layering PG on at least one of a top and a bottom of at least one of the first and second stacks, bending a PG end to extend between the first and second stacks along one or more of the multiple pairs of the braze parts in the first and second stacks and heating the multiple pairs of the braze parts of the first and second stacks to a brazing temperature to braze the braze parts of each of the first and second stacks together.

In accordance with additional or alternative embodiments, the PG has a thermal diffusivity of about 500 mm2/s or more and increases an effective thermal diffusivity of at least the first stack by about 3.0 times or more and correspondingly reduces a cycle time required to braze the braze parts of each of the first and second stacks together.

These and other advantages and features will become more apparent from the following description taken in conjunction with the drawings.

BRIEF DESCRIPTION OF THE SEVERAL VIEWS OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

In technological areas that involve brazing of multiple parts, it has recently been seen that braze cycle times can be problematic. For example, when parts are brazed together to form coldplates, braze cycle times can be very long. In these or other cases, each part can be provided as a metallic layer that is brazed to an adjoining metallic layer. Each adjoining pair of layers are stacked together in a stack with interleaved material layers with thermal conductivity equivalent or lower than the base material (such as steel) and placed in a brazing oven. The brazing oven is activated to bring the temperature of the stack up to the brazing temperature, which often takes a long time due to the center of the stack heating slowly as a function of the materials of the stack having relatively low thermal diffusivity. In some instances for large stacks, the braze cycle time can be up to 12 hours or more. Accordingly, a need exists for a way to reduced braze cycle times for large stacks of parts.

Thus, as will be described below, a method of reducing a cycle time of a brazing process for large stacks of parts is provided and includes replacing the interleaved material layers in the large stacks of parts with graphite sheets made of pyrolytic graphite (PG), for example, which has a relatively high thermal diffusivity and thus transfers heat to the center of the large stacks faster than otherwise possible.

With reference to FIG. 1 and FIGS. 2-5, a method 100 of decreasing a cycle time of a brazing process is provided.

Figure 2:
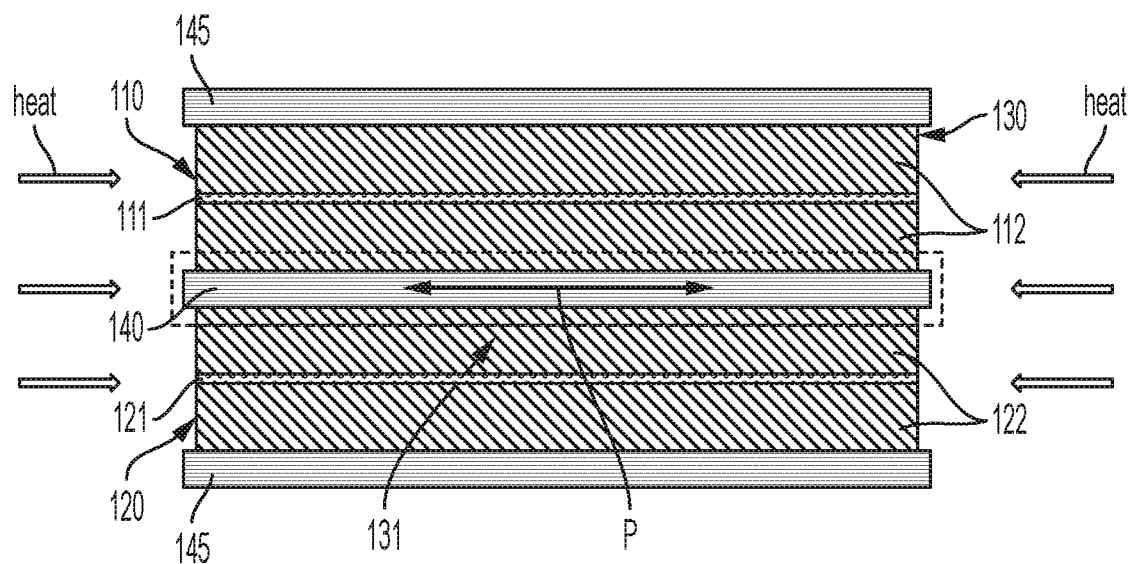
FIG. 2 is a schematic depiction of a stack of braze parts with an interleaved layer of pyrolytic graphite (PG) in accordance with embodiments.
Figure 4:
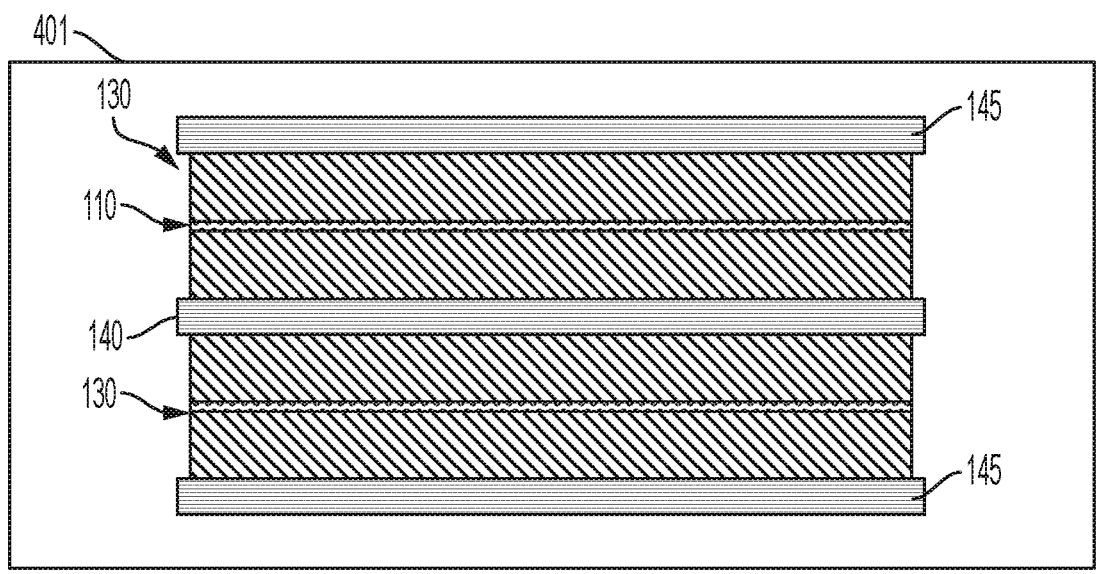
FIG. 4 is a schematic depiction of the stack of braze parts with the interleaved layer of PG of FIG. 2 in a braze oven in accordance with embodiments.

The method 100 initially includes arranging each of a first pair of braze parts 110 and a second pair of braze parts 120 together (block 101), stacking the first pair of the braze parts 110 and the second pair of the braze parts 120 to form a stack 130 (block 102) and interposing PG 140 between the first pair of the braze parts 110 and the second pair of the braze parts 120 in the stack 130 (block 103). Additional PG 145 can be provided or layered at one or both of the top and the bottom of the stack 130 (block 1035). While the stack 130 in FIGS. 2 and 4 is illustrated with only the first pair of braze parts 110 and the second pair of braze parts 120 for clarity and brevity, it is to be understood that additional pairs of braze parts and layers can be included in the stack 130. The first pair of the braze parts 110 can include filler or braze material 111 interposed between braze parts 112. The braze parts 112 can be provided as blocks or layers of generally flat and planar metallic material. The second pair of the braze parts 120 can similarly include filler or braze material 121 interposed between braze parts 122. The braze parts 122 can be provided as blocks or layers of generally flat and planar metallic material.

The method 100 can further include placing the stack 130 including the PG 140 in a braze oven 401 (see FIG. 4) and heating the first and second pairs of the braze parts 110, 120 to a brazing temperature of about 1050-1200° F. (block 104). This effectively brazes the braze parts 112 of the first pair of the braze parts 110 together and the braze parts 122 of the second pair of the braze parts 120 together. Whereas this process would require a significant amount of time in order to completely heat the center of the stack 130, the presence of the PG 140 in the stack 130 and the additional PG 145 increases an effective thermal diffusivity of the stack 130 and correspondingly reduces a cycle time required to braze the braze parts 112, 122 of each of the first and second pairs of the braze parts 110, 120 together. In accordance with embodiments, the PG 140 and the additional PG 145 can increase the effective thermal diffusivity of the stack 130 by several times (i.e., about 3.0 or more times) and correspondingly reduces a cycle time required to braze the braze parts 112, 122 of each of the first and second pairs of the braze parts 11, 120 together by several times (i.e., about 3.0 or more times). In accordance with further embodiments, the PG 140 and the additional PG 145 can have a relatively high thermal diffusivity of above about 500 mm2/s or more.

The reduced cycle timing is a function of at least the structure of the PG 140. The PG 140 (and the additional PG 145) includes multiple sheets 141 of PG material or other similar material. The relatively high thermal diffusivity of the PG 140, partially owing to the structure of the multiple sheets 141, is generally exhibited in a plane P of the PG 140. As such, as heat is applied to the stack 130 including the PG 140 in the braze oven 401, heat is transmitted along the plane P of the PG 140 at a relatively faster rate than in any other portion of the stack 130. This transmitted heat is then conducted from the PG 140 into at least a center portion 131 of the stack 130 and outwardly from there.

Figure 1:
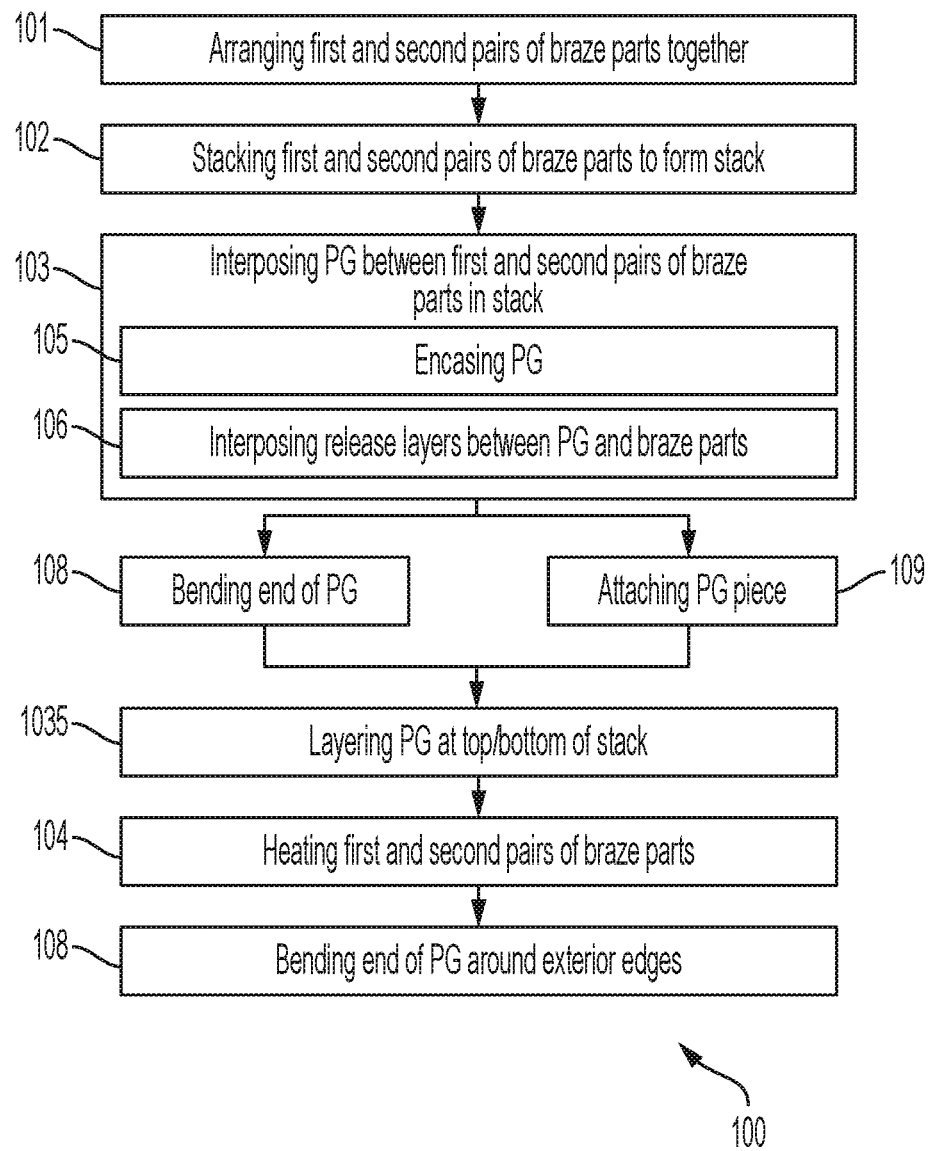
FIG. 1 is a flow diagram illustrating a method of decreasing a cycle time of a brazing process in accordance with embodiments.
Figure 3:
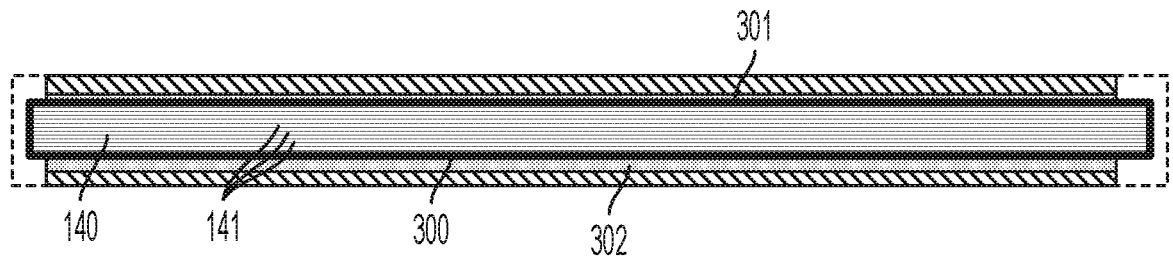
FIG. 3 is an enlarged view of the portion of FIG. 2 which is encompassed by dashed line 3 in accordance with embodiments.

The method 100 of FIG. 1 can further include encasing the PG 140 (and the additional PG 145) in a metallic encasement 300 (block 105) and interposing first and second stop-off layers 301, 302 between the PG 140 and each of the first and second pairs of the braze parts 110, 120, respectively (block 106). As shown in FIG. 3, the metallic encasement 300 can be formed of aluminum or another similar metallic material or alloy and is positioned at least on the upper and lower surfaces of the PG 140. In some cases, the metallic encasement 300 can completely encase an entirety of the PG 140. In some or all of these cases, the metallic encasement 300 can be provided as a solid sheet with few or no openings or as a frame with one or more relatively large opening. The first and second stop-off layers 301, 302 can be formed of metallic oxide powder such as aluminum oxide, titanium oxide, yttrium oxide, magnesium oxide, etc., or another similar material and prevents sticking of the PG 140 (where no metallic encasement 300 is provided or at an opening of a metallic encasement 300 provided as a frame) or the metallic encasement 300 to either of the first and second pairs of the braze parts 110, 120 during or following the heating/brazing.

In accordance with embodiments and as shown in FIG. 4, the heating can be executed in the braze oven 401.

Figure 5:
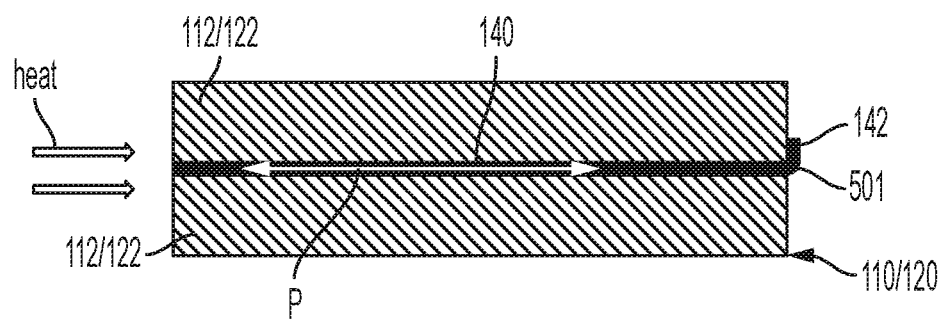
FIG. 5 is an enlarged schematic view of braze parts with an interleaved layer of PG having an end with increased surface area in accordance with embodiments.
Figure 6:
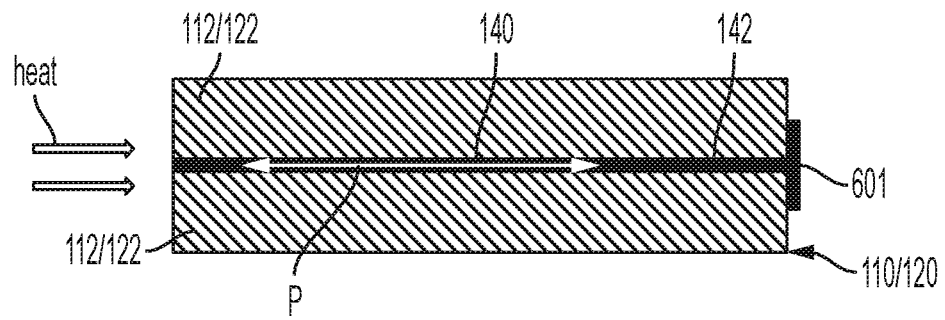
FIG. 6 is an enlarged schematic view of braze parts with an interleaved layer of PG having an attachment with increased surface area in accordance with embodiments.

The method 100 of FIG. 1 can also include at least one or more of bending an end 142 of the PG 140 around exterior edges of at least one braze part 112, 122 of at least one of the first and second pairs of the braze parts 110, 120 (block 108) and attaching an additional PG piece to the end 142 of the PG 140 to abut with the exterior edges of at least one braze part 112, 122 of at least one of the first and second pairs of the braze parts 110, 120 (block 109). As shown in FIG. 5, the bending can be done where there is extra length of the PG 140. As long as the bend 501 is smooth and avoids a kink or fold, the multiple sheets 141 of the PG 140 should remain intact and capable of transmitting heat lengthwise. Thus, heat applied from a side as illustrated in FIG. 5 will be transmitted along the plane P of the PG 140 towards the bend 501. At the bend 501, the heat will be transmitted along and around the bend 501 and then vertically along the length of the end 142 where the plane P is oriented vertically. The heat transmitted to the end 142 can then be conducted into the proximal portions of the of at least one braze part 112, 122 of the at least one of the first and second pairs of the braze parts 110, 120. As shown in FIG. 6, the attaching of the additional PG piece effectively lengthens the PG 140. Thus, heat applied from a side as illustrated in FIG. 6 will be transmitted along the plane P of the PG 140 towards the additional PG piece 601. At the additional PG piece 601, the heat will be transmitted to the additional PG piece 601 and vertically along the length of the vertically oriented additional PG piece 601. The heat transmitted to the additional PG piece 601 can then be conducted into the proximal portions of the of at least one braze part 112, 122 of the at least one of the first and second pairs of the braze parts 110, 120. The bending and the attaching of the additional PG piece can be similarly executed with respect to the additional PG 145.

Figure 7:
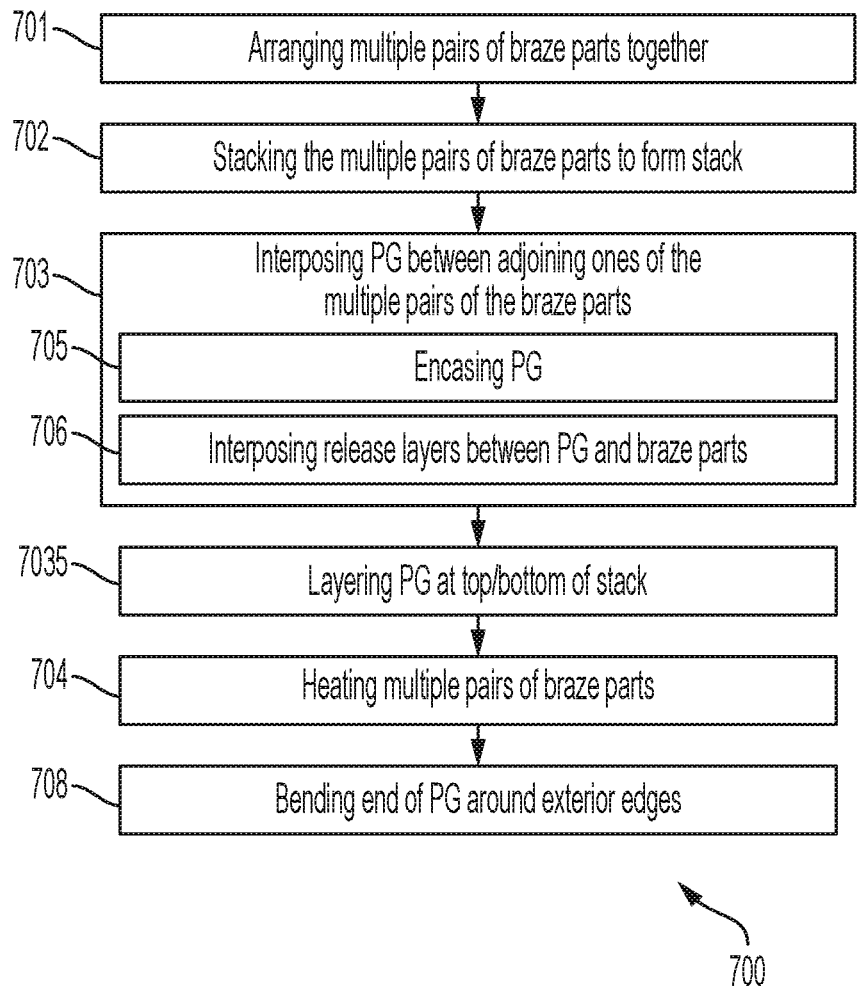
FIG. 7 is a flow diagram illustrating a method of decreasing a cycle time of a brazing process in accordance with further embodiments.

With reference to FIG. 7, a method 700 of decreasing a cycle time of a brazing process is provided. The method 700 is generally similar to the method 100 and need not be described in detail. The method 700 includes arranging multiple pairs of braze parts together, each of the multiple pairs of the braze parts having braze material interposed between the braze parts (block 701), stacking the multiple pairs of the braze parts to form a stack (block 702), interposing PG between adjoining ones of the multiple pairs of the braze parts (block 703), layering additional PG 145 can be provided or layered at one or both of the top and the bottom of the stack 130 (block 7035) and heating the multiple pairs of the braze parts to a brazing temperature (block 704). The method 700 can further include encasing the PG in a metallic encasement (block 705) and interposing first and second stop-off layers between the PG and each of the corresponding ones of the multiple pairs of the braze parts, respectively (block 706). In addition, the method 700 can further include bending an end of the PG around exterior edges of at least one braze part (block 708).

Figure 8:
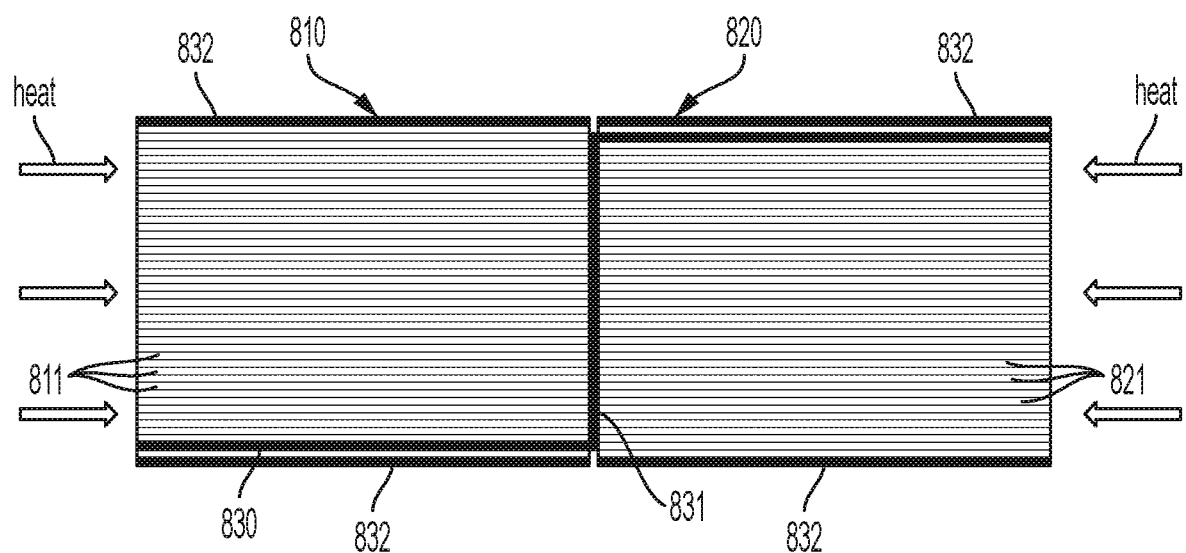
FIG. 8 is a schematic depiction of stacks of braze parts with an interleaved layer of PG to illustrate a method of decreasing a cycle time of a brazing process in accordance with embodiments.

With reference to FIG. 8, a method of decreasing a cycle time of a brazing process is provided. As shown in FIG. 8, the method includes forming first and second stacks 810, 820, where each of the first and second stacks 810, 820 include multiple pairs of braze parts 811, 821. The method further includes arranging the first and second stacks 810, 820 adjacent to one another, interposing PG 830 between at least one adjoining pair of the multiple pairs of the braze parts 811 in the first stack 810 and bending at least an end 831 of the PG 830 to extend between the first and second stacks 810, 820 along one or more of the multiple pairs of the braze parts 811, 821 in the first and second stacks 810, 820. The end 831 of the PG 830 can be elongate and actually extend along a substantial height of the first and second stacks 810, 820 and, in some cases, extend between at least one adjoining pair of the multiple pairs of the braze parts 821 in the first stack 820. Additional PG layers 832 can also be layered on at least one of a top and a bottom of at least one of the first and second stacks 810, 820. In addition, the method includes heating the multiple pairs of the braze parts 811, 821 of the first and second stacks 810, 820 to a brazing temperature to braze the braze parts 811, 821 of each of the first and second stacks 810, 820 together. As above, the PG 830 has a thermal diffusivity of about 500 mm2/s or more and increases an effective thermal diffusivity of at least the first stack 810 (and the second stack 820 in the illustrated case) by several time (i.e., about 3.0 times or more) and correspondingly reduces a cycle time required to braze the braze parts of each of the first and second stacks 810, 820.

That is, in the illustrated case in FIG. 8, as heat is applied to the first stack 810 and the second stack 820, the heat is transmitted along the plane of the PG 830 at a relatively faster rate than in any other portion of the first stack 810 and the second stack 820 and along the plane of the portion of the PG 830 which is between the first stack 810 and the second stack 820. This transmitted heat is then conducted from the (vertical) portion of the PG 830 between the first stack 810 and the second stack 820 (where the plane of the PG 830 is vertically oriented) and into proximal sides of the first stack 810 and the second stack 820 and outwardly from there.

Therefore, it is apparent that multiple stacks of braze parts can be brazed together in a braze oven at a same time and with a reduced cycle time.

Benefits of the features described herein are the provision of a method of reducing a cycle time of a brazing process for large stacks of parts and includes replacing the interleaved material layers in the large stacks of parts with graphite sheets made of PG, for example. The PG has a relatively high thermal diffusivity and thus transfers heat to the center of the large stacks faster than otherwise possible.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of decreasing a cycle time of a brazing process, the method comprising:
    arranging each of first and second pairs of braze parts together, each of the first and second pairs of the braze parts having braze material interposed between the braze parts;
    stacking the first pair of the braze parts to form a first stack;
    stacking the second pair of the braze parts to form a second stack;
    interposing multiple sheets of pyrolytic graphite (PG) between the first stack and the second stack; and
    heating the first and second pairs of the braze parts to a brazing temperature to braze the braze parts of each of the first and second pairs of the braze parts together.

2. The method according to claim 1, wherein the PG increases an effective thermal diffusivity of the stack and correspondingly reduces a cycle time required to braze the braze parts of each of the first and second pairs of the braze parts together.

3. The method according to claim 2, wherein the PG increases the effective thermal diffusivity of the stack by about 3.0 times or more.

4. The method according to claim 1, wherein the PG has a thermal diffusivity of about 500 $mm^2/s$ or more.

5. The method according to claim 1, wherein the brazing temperature is between about 1050-1200° F.

6. The method according to claim 1, further comprising interposing first and second stop-off layers between the PG and each of the first and second pairs of the braze parts, respectively.

7. The method according to claim 1, further comprising encasing the PG in a metallic encasement.

8. The method according to claim 1, further comprising layering PG on at least one of a top and a bottom of the stack.

9. The method according to claim 1, further comprising at least one or more of:
    bending the PG around exterior edges of at least one of the first and second pairs of the braze parts; and
    attaching an additional PG piece to the PG to abut with the exterior edges of the at least one of the first and second pairs of the braze parts.

10. A method of decreasing a cycle time of a brazing process, the method comprising:
    arranging multiple pairs of braze parts together, each of the multiple pairs of the braze parts having braze material interposed between the braze parts;
    stacking the multiple pairs of the braze parts to form multiple stacks;
    interposing multiple sheets of pyrolytic graphite (PG) between adjoining ones of the multiple stacks; and
    heating the multiple pairs of the braze parts to a brazing temperature to braze the braze parts of each of the multiple pairs of the braze parts together.

11. The method according to claim 10, wherein the PG increases an effective thermal diffusivity of the stack and correspondingly reduces a cycle time required to braze the braze parts of each of the multiple pairs of the braze parts together.

12. The method according to claim 11, wherein the PG increases the effective thermal diffusivity of the stack by about 3.0 times or more.

13. The method according to claim 10, wherein the PG has a thermal diffusivity of about 500 $mm^2/s$ or more.

14. The method according to claim 10, wherein the brazing temperature is between about 1050-1200° F.

15. The method according to claim 10, further comprising interposing stop-off layers between the PG and each of the corresponding ones of the multiple pairs of the braze parts, respectively.

16. The method according to claim 10, further comprising encasing the PG in a metallic encasement.

17. The method according to claim 10, further comprising layering PG on at least one of a top and a bottom of the stack.

18. The method according to claim 10, further comprising at least one or more of:
    bending the PG around exterior edges of at least one of the multiple pairs of the braze parts; and
    attaching an additional PG piece to the PG to abut with the exterior edges of the at least one of the first and second pairs of the braze parts.

19. A method of decreasing a cycle time of a brazing process, the method comprising:
    forming first and second stacks, each comprising multiple pairs of braze parts;
    arranging the first and second stacks adjacent to one another;
    interposing pyrolytic graphite (PG) between at least one adjoining pair of the multiple pairs of the braze parts in the first stack;
    layering PG on at least one of a top and a bottom of at least one of the first and second stacks;
    bending a PG end to extend between the first and second stacks along one or more of the multiple pairs of the braze parts in the first and second stacks; and
    heating the multiple pairs of the braze parts of the first and second stacks to a brazing temperature to braze the braze parts of each of the first and second stacks together.

20. The method according to claim 19, wherein the PG has a thermal diffusivity of about 500 $mm^2/s$ or more and increases an effective thermal diffusivity of at least the first stack by about 3.0 times or more and correspondingly reduces a cycle time required to braze the braze parts of each of the first and second stacks together.

* * * * *